Sept. 1, 1942.  D. H. BOTTRILL  2,294,867
VARIABLE PITCH AIRSCREWS FOR AIRPLANES
Filed Feb. 13, 1940  4 Sheets-Sheet 1
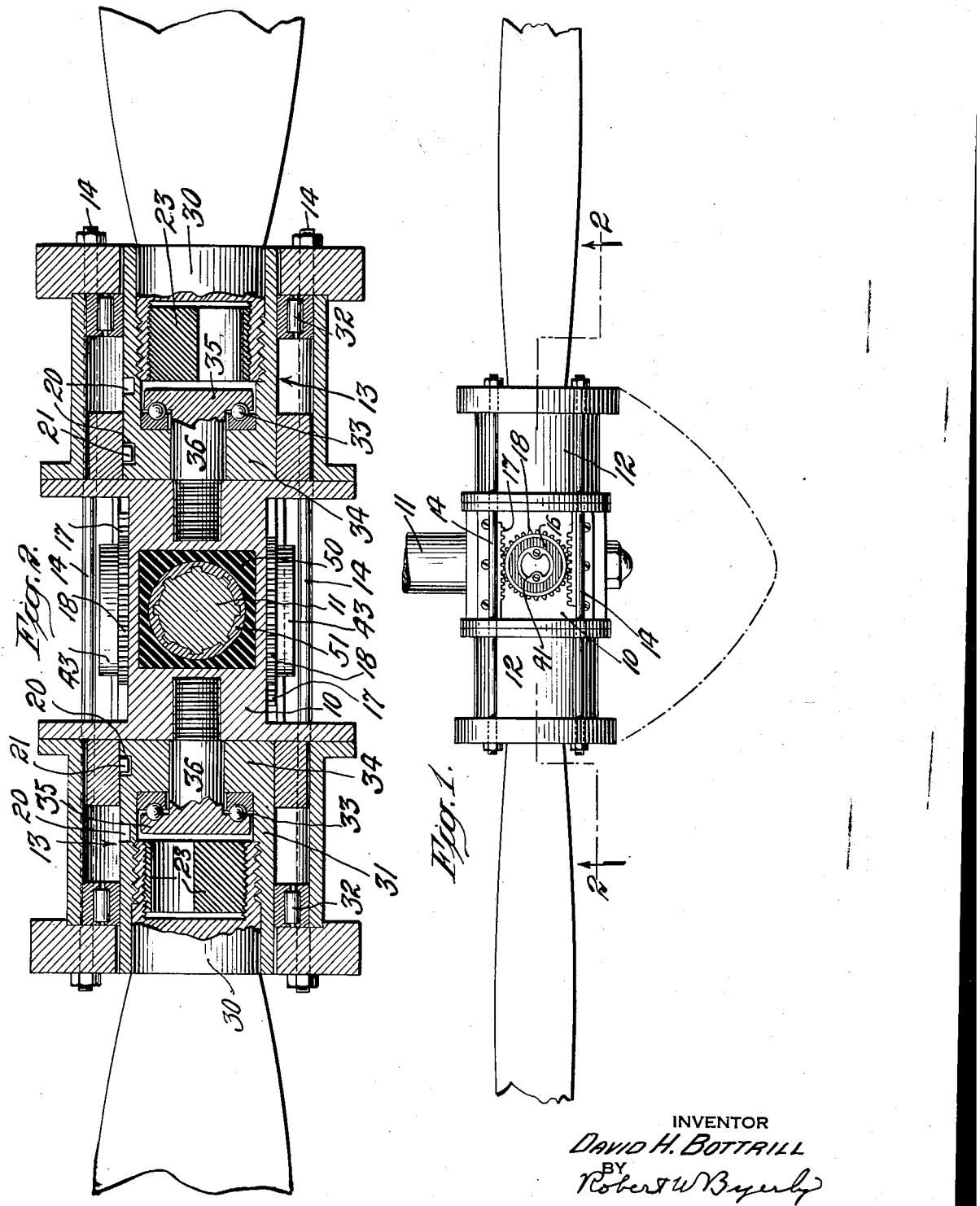
INVENTOR
DAVID H. BOTTRILL
BY
Robert W Byerly
ATTORNEY

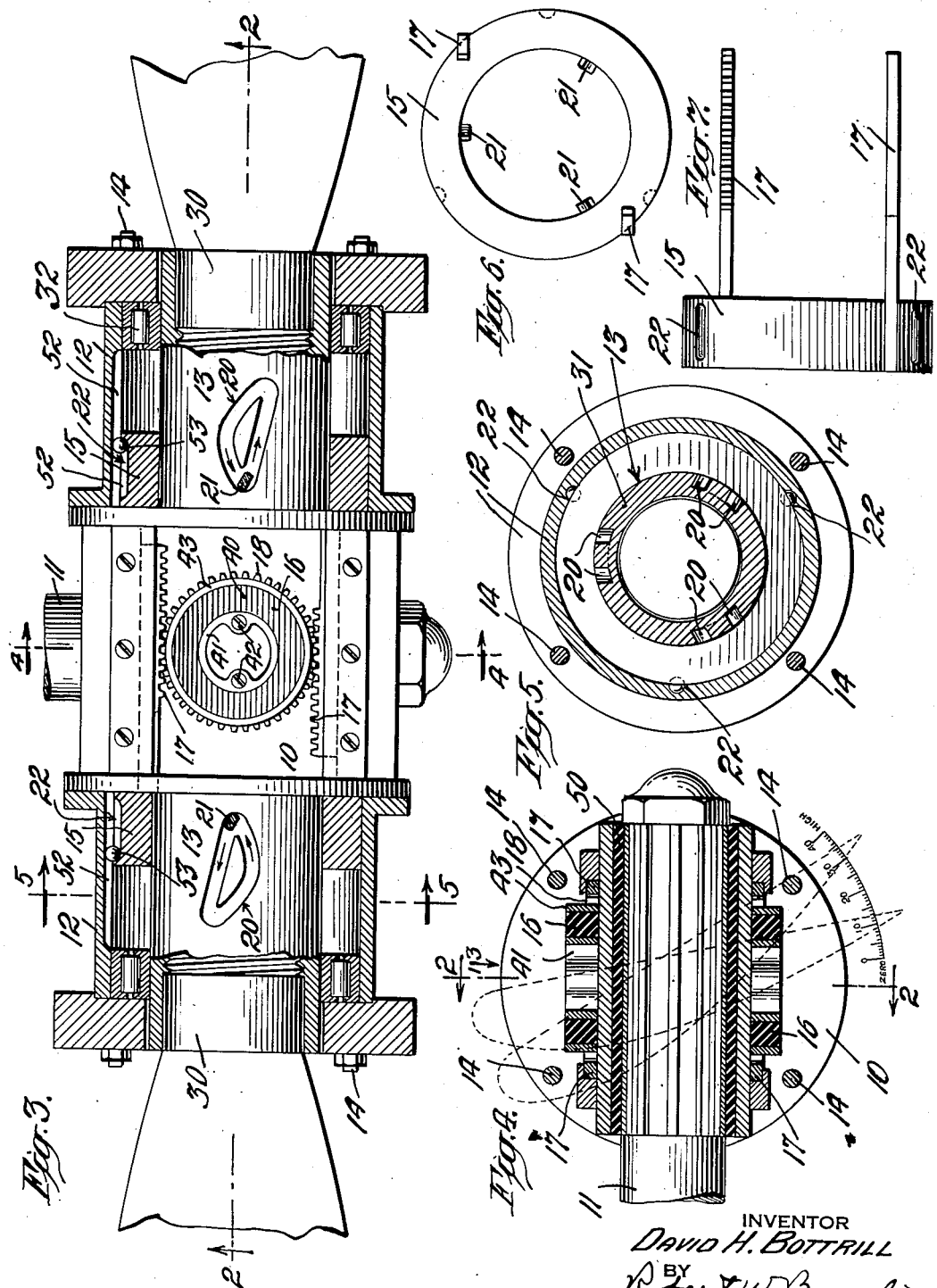

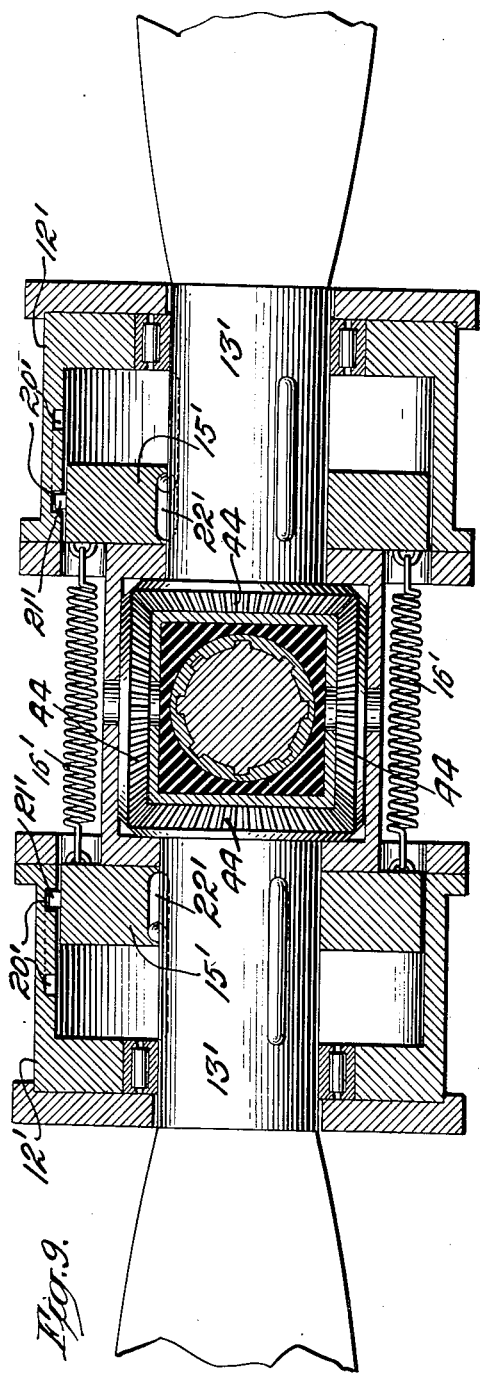

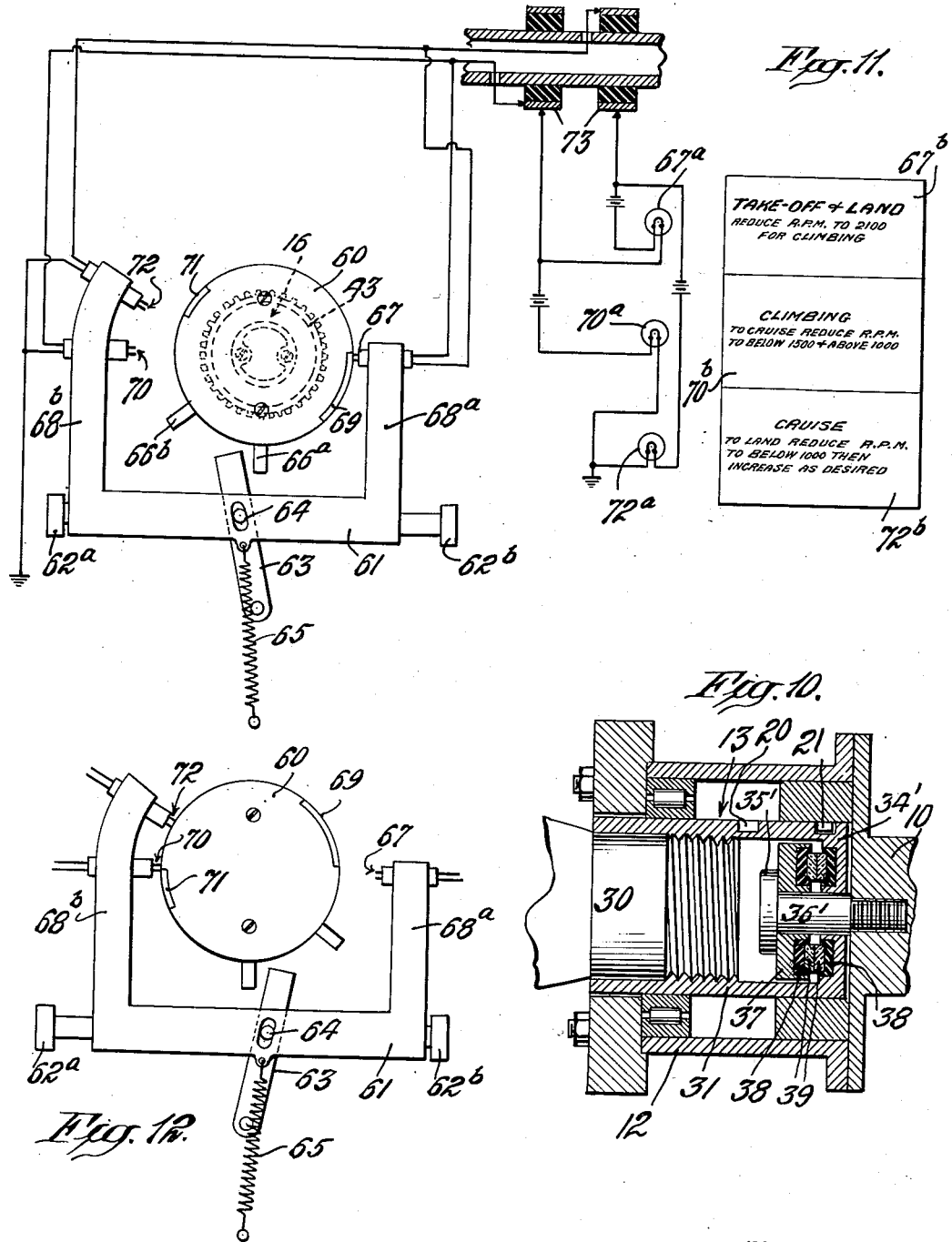

Patented Sept. 1, 1942

2,294,867

UNITED STATES PATENT OFFICE 2,294,867

VARIABLE PITCH AIRSCREW FOR AIRPLANES

David H. Bottrill, Montreal, Quebec, Canada, assignor to Canadian Car & Foundry Company Limited, Montreal, Quebec, Canada, a corporation of Quebec, Canada Application February 13, 1940, Serial No. 318,695

15 Claims. (Cl. 170—162)

This invention relates to variable pitch airscrews for airplanes and provides a variable pitch airscrew which is fully automatic and at the same time simple in construction and reliable in operation.

The changes of the blade pitch of an airscrew which are required to achieve both safety in flying and maximum engine efficiency may be summarized as follows: During the take-off, the engine speed is at its maximum and the pitch should be low. In the climb, which follows the take-off, the engine speed is high but below its maximum and the pitch of the blades should be greater than during the take-off. In cruising, the engine speed is moderate and the pitch of the blades should be high, and should tend to increase with increase in speed and decrease with decrease in engine speed, so as to maintain the engine speed constant, notwithstanding differences in air density. In landing, the engine speed is low and the pitch of the blades should be low and should remain low on increase of engine speed in order that a take-off may be made immediately after a landing or attempted landing not correctly placed on a landing field or runway.

It is thus apparent that variation in pitch should be a different function of variation in engine speed under each different condition of flying. In landing and take-off, the pitch must be low, and in order to provide for safety an increase of the engine speed from its minimum to its maximum should cause no appreciable change in pitch. In going into the climb after a take-off, the change in pitch should be an inverse function of the change in engine speed, that is to say, as the engine is slowed, the pitch should increase. In cruising, the change of pitch should be a direct function of the engine speed, so that the airscrew may act as the governor to keep the engine speed constant.

To provide automatically for the different conditions mentioned is no easy matter. It has been accomplished heretofore only by mechanism of such complication that it is unavailable for any but the largest airplanes, and even in such planes it has proved safer and more satisfactory to provide a pitch control which is only partly automatic.

My invention is based on the discovery that it is possible to utilize variation in speed of rotation to control blade pitch automatically for all flying conditions by making change in pitch a function of change in speed of rotation, and changing the nature of this function at three different points in a complete rotary speed cycle. By "a complete rotary speed cycle," I mean a change in engine speed and speed of rotation of the airscrew from a minimum speed (which may be idling speed) to the maximum speed at which the engine may be operated and then back to minimum speed. For simplicity, I shall refer to this cycle of change in speed of rotation as "a complete rotary speed cycle," although the changes in engine speed are seldom, if ever, continuous and usually involve many changes in both directions, particularly in the half of the cycle between maximum speed and minimum speed. The points in the complete cycle at which I cause alterations in the relation between change in pitch and change in speed of rotation are the minimum speed point, the maximum speed point and an intermediate point in the decrease from maximum speed to minimum speed. I have found that the required automatic interrelation between change in pitch and change in rotational speed may be effected very simply by connecting a resiliently-held, centrifugal controlling element with the spindles of the airscrew blades through the medium of a cam with two slopes inclined in different directions to control variation in pitch after the engine has acquired its maximum speed, and providing a means, which may be a part of the cam itself, for rendering these slopes of the cam ineffective when the engine speed is increasing from minimum to maximum.

The invention will be more clearly understood from a detailed description of the simple, fully automatic airscrews embodying it, and from this description it will appear that the airscrew which I have invented embodies other improvements in addition to the fundamental one which makes it both fully automatic and simple in construction.

In the accompanying drawings:

Fig. 1 is a top view of the airscrew embodying my invention;

Fig. 2 is an enlarged section of the airscrew hub taken on the lines 2—2 of Fig. 1 and Figs. 3 and 4, that is, on a plane which contains the axis of the airscrew blades and is perpendicular to the axis of revolution of the airscrew;

Fig. 3 is an enlarged top view of the airscrew hub looking in the same direction as Fig. 1, and showing some parts sectioned on the axis of the airscrew blades;

Fig. 4 is a section on the line 4—4 of Fig. 3, showing in dotted lines two different pitch positions of the airscrew blades;

Fig. 5 is a section on the line 5—5 of Fig. 3;

Figs. 6 and 7 are end and side views of one of the centrifugal elements and the racks and cam followers secured to it;

Figs. 8a to 8d are a series of diagrams showing different positions of the cam 20 and the cam follower 21 shown at the right-hand side of Fig. 3, and indicating the rotational speeds at which the cam follower takes different positions in its line of movement and the changes in pitch caused by turning movements of the blade spindle 13 on a scale corresponding to that in Fig. 4;

Fig. 9 is a view similar to Fig. 3 showing the embodiment of the main features of my invention in a somewhat different and, I believe, somewhat less desirable form of airscrew hub construction;

Fig. 10 is a partial view similar to Fig. 2 showing a glass thrust bearing which in itself constitutes a subsidiary but important part of my invention; and Figs. 11 and 12 are diagrammatic views of an electric indicator for indicating visually the part of the cam grooves in which the cam followers are at any time.

The airscrew shown in Figs. 1 to 8d has a hub consisting of a box-like central part 10 through which the engine shaft 11 extends, and two lateral tubular portions 12 in which the spindles 13 of the airscrew blades are turnably mounted. The tubular extensions 12 are secured to the sides of the box-like central portion 10 and the whole is securely held together by means of tie rods 14. In the tubular extensions 12 of the hub outside the blade spindles 13 are centrifugal controlling elements 15 which have the form of rings or sleeves which tend to slide outwardly away from the center of rotation of the airscrew under the effect of centrifugal force. The controlling elements 15 are urged inwardly toward the axis of the airscrew by torsion springs 16 located in the central box-like portion 10 of the hub on opposite sides of the shaft 11 and connected to the controlling elements 15 by racks 17 and pinions 18. The strength of the springs 16 is so proportioned to the weight of the controlling elements 15 that the elements 15 are held in the position shown in Fig. 2 at the inner ends of their paths when the speed of rotation is at or below a minimum engine speed (for example, 1500 R. P. M.) and are held at the outer ends of their paths at maximum engine speed (for example, 2400 R. P. M.) and occupy different intermediate positions for each speed rotation between the minimum and maximum.

The pitch of the blades is controlled by the controlling element through a cam connection which translates radial movements of the controlling elements 15 into turning movements of the blade spindles 13. This cam connection necessarily includes some fixed portion of the hub, such as the tubular extensions 12, with respect to which the blade spindles are to be turned. It includes a cam of particular construction, which is hereinafter described in detail, a cam follower and usually also a spline. In the form shown in Figs. 1 to 8d, cams 20 are formed on the exterior of the blade spindles 13 and cooperate with followers 21 projecting from the inner surfaces of the controlling elements 15 while splines 22 are used between the controlling elements 15 and the fixed hub casing 12. While this arrangement of the cam connection has the advantage of leading to a very simple construction, it is apparent that the same cam connection can be obtained by placing splines 22' between the controlling elements 15' and blade spindles 13', and cams 20' and cam followers 21' between the controlling elements 15' and the casing 12', as shown in Fig. 9.

Each of the cams 20 has the form of an approximately triangular groove, having a slope $a$ so inclined as to make the blade pitch vary inversely to speed of rotation, a slope $b$ inclined in the opposite direction so as to make the pitch vary directly with speed of rotation, and a portion $c$ whose ends are on a line nearly parallel to the axis of the spindle. Provision is made for causing the cam followers 21 to move along the slopes $a$ and $b$ when the controlling elements 15 are moving from their outer to their inner positions, that is to say, when the engine speed is being reduced from its maximum speed to its minimum speed, and for causing the cam followers to remain out of contact with these slopes and move along the portion $c$ when the controlling elements 15 are moving from their inner to their outer positions, that is to say, when the engine speed is increasing from minimum to maximum. In other words, one complete reciprocation of the controlling elements 15 causes the cam followers 21 to make a complete circuit of the triangular cam grooves. While various means, such as switches, may be used to accomplish this result, it is accomplished effectively and without moving parts by cams and cam followers having the form illustrated in the drawings. The cam followers 21 are rectangular in cross-section and have their longest diameters turned approximately in the direction of the portion $c$ of the cam grooves. The ends of the cam grooves are so formed that, when the cam followers lie against the outer ends of the grooves, that is, when the controlling elements 15 are in their outer position, the inner corners of the cam followers 21 extend beyond the points of the inner peripheries of the grooves, so that inward movement of the controlling elements 15 and the cam followers brings the cam followers into engagement with the slope $a$. In the same way, the outer and inner edges of the cam grooves at the inner end of the grooves are formed so that, after the controlling elements 15 and cam followers are brought into their inner position, outward movement will cause them to enter the portion $c$ of the cam grooves.

In order that the cam followers may move around the corners of the cam grooves in the manner which has been described, it is desirable that there should be no rotary turning moment on the blade spindles tending to turn them towards low pitch position when the cam followers are in the outer ends of the cam grooves, and no such turning moment towards high pitch position when the cam followers are at the inner ends of the cam grooves. To avoid the centrifugal twisting moment of the blades which tends to cause them to turn to low pitch position when the speed of rotation is high, the eccentricity of the weight of the blades caused by their airfoil form is counterbalanced in known manner so that the centrifugal turning moment of the blades is eliminated or at least greatly reduced. This is accomplished conveniently in the structure shown by eccentric weights 23 adjustably screwed into the blade spindles. The counterbalancing of the centrifugal twisting moment of the blades leaves only the aerodynamic moment of the blades which tends to turn them into high pitch position. This moment is very small but is appreciable at high speeds and thus aids passage of the cam followers around the outer corners of the cam grooves when the cam followers are moved inwardly by reducing the engine speed from its maximum speed. The aerodynamic moment of the blades is inappreciable at low speeds and, therefore, does not prevent the cam followers from moving around the inner ends of the cam grooves in the manner hereinbefore described when they are moved outwardly by increasing the engine speed from the minimum.

The nature of the automatic pitch control obtained through the cam connection which has been described is apparent from the diagrams, Fig. 8a to 8d:

When the engine is turning at or below a minimum speed of, for example, 1000 R. P. M., the controlling elements 15 are held in their inner positions shown in Fig. 4 by the springs 16, so that their cam followers 21 are in the inner ends of the cam grooves, as shown in Fig. 4 and Fig. 8a. This holds the blade spindles 13 with the blades in a low pitch position. In taking-off, the engine is accelerated to its maximum speed (e. g. 2400 R. P. M.). When this is done, centrifugal force throws the controlling elements 15 to their outer position, moving the cam followers 21 along the portion c of the cam grooves to the outer corner of the grooves, as shown in Fig. 8b. In this position of the cam followers also, the blade spindles 13 are so turned that the blades are in low pitch position. The proper condition for taking-off—maximum engine speed and low pitch blades—are thus attained by merely advancing the throttle of the engine.

As soon as the take-off has been effected, good practice calls for reducing the engine speed somewhat below its maximum speed, as the latter cannot be safely maintained for more than one or two minutes. When the pilot makes this reduction in engine speed (e. g. to 2100 R. P. M.) immediately after the take-off, the controlling elements 15 move inward from their outer positions and the cam followers 21 move up the slope a of the cam grooves to a position such as that shown in Fig. 8c. This turns the blade spindles so as to increase the pitch of the blades, and thus gives the proper conditions for the climb after the take-off—high (but not maximum) engine speed and an intermediate blade pitch.

After climbing from the take-off, it is customary to reduce engine speed for cruising. Such reduction of engine speed (e. g. to below 1500 R. P. M.) causes the controlling elements 15 to move further inward, moving their cam followers 21 over the upper corner of the cam groove to the slope b so that they occupy a position such as that shown in Fig. 8d. The proper conditions for steady and efficient engine operation in cruising are attained by this reduction of the engine speed to cruising speed, for the cam followers are now located in portions of the cam grooves which are so inclined that any increase in engine speed will automatically increase the pitch of the blades, while any decrease in engine speed will automatically decrease the pitch of the blades. The airscrew, therefore, acts as a governor and keeps the engine speed constant, making it unnecessary to change the throttle position to compensate the variations in air density. When used with an engine of moderate power, such as those customarily provided on light airplanes used by amateur pilots, the airscrew introduces an important factor of safety by preventing the pilot from dangerous racing of the engine. Racing is prevented because the blade pitch is so high when the cam followers are at the joining point of the slopes a and b of the cam grooves that even a wide opening of the engine throttle when the cam followers are in the cruising position shown in Fig. 8d does not provide enough power to carry the speed of the engine above 1500 R. P. M. because of the strong braking effect of the airscrew when the blades are at very high pitch. Similarly the braking effect of the airscrew prevents the engine from racing in the case of a dive with the throttle in cruising position, and the cam may be so formed as to make the pitch at the joining point between the slopes a and b high enough to prevent the engine from increasing its speed about the rotational speed necessary to carry the cams over this joining point even in the case of a dive with the throttle open.

To prepare for landing, the pilot, at least momentarily, reduces his engine speed to or below the minimum (e. g. 1000 R. P. M.), which brings the controlling elements 15 to their inner positions and moves the cam followers 21 to the inner ends of the cam grooves as shown in Fig. 8a. In this way, proper conditions for landing—low engine speed and low blade pitch—are attained. Furthermore, the conditions are consonant with safety, for, if, for any reason, the intended landing cannot properly be effected, proper conditions for getting up out of danger may be obtained instantly by merely advancing the engine throttle to obtain a high engine speed. Such increase in engine speed causes the cam followers to move along the portion c of the cam groove, as in taking-off, so that the blade pitch remains low and rapid engine acceleration and plane acceleration can be obtained. In this connection, it may be noted that, while the ends of the portion c are located so as to cause nearly the same low pitch (compare Figs. 8a and 8b), the part of the portion c between its ends is located so as to turn the blade spindles to a still lower pitch position. While this is not essential, it has the advantage of removing nearly all load from the engine during the speeding up of the engine for taking-off and thus decreases the time required for the engine to accelerate to its maximum speed.

The practical value of my new airscrew depends not only upon its novel mode of operation which has been described, but also upon its simple, light and strong construction which involves several features forming a part of my invention.

The mounting of the blade spindles is a matter of importance, as the operation of the device is dependent upon having the blades turn easily in spite of the strong centrifugal force tending to draw them out of the hub. In the blade mounting shown in Fig. 2, a collar 30 at the inner ends of a blade is screwed into a sleeve 31, mounted on roller bearings 32. The eccentric weight 23 which counteracts the centrifugal twisting movement of the blade is screwed into internal threads in the collar 30. The blade is held against radial outward movement by a thrust bearing 33 between an inwardly extending flange 34 at the inner end of the sleeve 31, and an outwardly extending flange 35 on a stud 36 screwed into the box-like central portion 10 of the hub. The thrust bearing 33 may take the form of a conventional roller bearing as shown in Fig. 2, but a considerable saving in weight and in expense may be obtained by using the glass thrust bearing shown in Fig. 10. This bearing includes the inwardly extending flange 34' of the blade spindle sleeve 31 and a metal disc 37 held by the flange 35' of the stud 36'. The opposed surfaces of the flange 34' and the disc 37 contain annular recesses in which are seated annular backings 38, made of a material capable of flowing under the application of heavy pressures, and annular facings 39 of glass. The opposed surfaces of the facings 39 project beyond the opposed surfaces of the flange and disc 34', 37, and are optically flat. The glass facings are of a width slightly less than that of the annular recesses in the flange 34' and disc 37, so that they do not come in contact with metal. The backings 38 have lips overlapping the inner end outer edges of the facings 39 to hold the facings out of contact with the metal. The contacting surfaces of the glass facings are well lubricated with heavy lubricating oil free from grit. The facings may be made of any good quality of glass, but glass made from boron silicate of the type sold under the trade-mark "Pyrex" is most desirable. The backings 38 are made of incompressible material which is softer than structural metal and capable of flow under the application of pressures such as are applied to the bearings. Vulcanized hard rubber is satisfactory for the backings, as is also soft metal such as a mixture of antimony and lead. The slight flowing of the material of the backings is of great importance, since it distributes the flow evenly over the back surfaces of the facings, notwithstanding unavoidable irregularities in the metal surfaces on which the bearing is mounted, and permits perfect alignment and even contact of the optically flat front surfaces of the facings. The glass bearing illustrated has been found capable of operating under loads of 10,000 pounds per square inch of bearing surface without crushing or in any way injuring the glass facings, and, when so loaded and lubricated, has a coefficient of starting friction of the order of 0.005, that is to say, as low as that of the best roller bearings. The wear on the bearing surfaces, if it exists, is so slow as to be imperceptible and negligible. The bearing has about one-quarter of the weight of a conventional roller bearing, capable of carrying the same load, and its cost is very much less than that of a roller bearing. A glass bearing of the type described constitutes the subject-matter of my co-pending application Serial No. 318,696, filed February 13, 1940. An important feature of my new airscrew consists in the use of such a glass thrust bearing to reduce the weight and expense of the airscrew and to insure easy turning of the blades by the cam.

Another important feature of my new airscrew which contributes to its lightness and its durability lies in the use of rubber torsion springs to retract the controlling elements 15. The torsion springs 16 shown in Fig. 3 consist of an annular block of rubber 40 having its inner cylindrical surface vulcanized to a metal ring 41 which is fixed to the central block 10 of the hub by screws 42. The outer cylindrical surface of the rubber is vulcanized to a rim 43 on whose periphery the pinion 18 is formed. The stress applied to the rubber block 40 by the turning of the rim 43 is a sheer stress. It has been found that, while rubber deteriorates rapidly or takes a permanent set under tension and compression, the placing of rubber under sheer stress does not injure it, but, on the contrary, permits it to retain its elasticity without diminution over long periods. A rubber annulus of 4" outer diameter, 2½" inner diameter and ¾" thickness will, without overstressing, furnish a resilient force, which is sufficient to counterbalance the centrifugal pull of 664 lbs. exerted by a controlling element 15 of 1 lb. in weight. The dimensions mentioned are suitable in an airscrew for a 75 H. P. airplane motor with a maximum speed of 2400 R. P. M.

To insure the centering and easy movement of the controlling elements 15, the splines between them and the hub casing 12 are preferably three in number, equally spaced around the circumference, and each consisting of aligned grooves 52 containing bearing balls 53. Three cams 20 are equally spaced around the circumference of each blade spindle 13 to avoid any unbalanced stress between the controlling elements 15 and the spindles.

The connection between the controlling elements 15 and the torsion springs serves to interlock the two controlling elements. The two racks 17 secured to each controlling element 15 are located at diametrically opposite points as shown in Figs. 6 and 7, so that the pinion 18 of each torsion spring is engaged at its upper edge by a rack attached to one of the controlling elements 15 and at its lower edge by a rack attached to the other controlling element 15. This interlocking insures a symmetrical position of the controlling elements at all speeds and constitutes a simple and effective method of making the pitch of the two blades exactly equal at all times. This is important in order to avoid dangerous unbalanced stresses. In the construction such as that shown in Fig. 9 in which the controlling elements 15' are not interlocked, it is necessary to interlock the blade spindles 13' as by means of the four beveled gears 44 shown in Fig. 9.

Another valuable feature of the construction of my new airscrew lies in means for preventing the transmission of vibration between the airscrew hub and the engine shaft. This is effected by a rectangular block of rubber 50 which extends through the central block 10 of the hub and contains a cylindrical hole in which is secured a metal sleeve 51 into which the engine shaft 11 is splined.

The construction illustrated in Fig. 9, which has been referred to as a less desirable embodiment of the main features of my invention, is in general similar to the construction previously described except in the particulars already noted. As in this case the cam and follower connection is between the bearing casing 12' and the controlling elements 15', while the spline connection 22' is between the controlling elements and the blade spindles 13', the controlling elements 15' have a turning as well as a reciprocatory movement. The return movement of the controlling elements is provided by tension springs 16' extending between them which do not interfere with their turning movement. It is apparent that, if desired, a cam and follower connection could be used at both the inner and outer peripheries of the controlling elements, so that the controlling elements would undergo a part, but not all, of the turning movement applied to the blade spindles. This arrangement would permit reducing the inclination of the slopes of the cams, since the turning movements caused by the cams at the inner and outer surfaces of the controlling elements would be added.

Figs. 11 and 12 show diagrammatically an electric indicator to be incorporated in my airscrew to advise the pilot at all times of the nature of the relation between rotational speed and blade pitch, or in other words, to let the pilot know whether the cam followers 21 are in the part a, the part b or the part c of the triangular groove of the cams 20. Since the proper relation between change in pitch and change in rotational speed is secured automatically by the proper and usual control of engine speed, such an indicator is not essential in the use of the new airscrew; but it is of value when the new airscrew is used by pilots not familiar with variable pitch airscrews.

The indicator illustrated in Figs. 11 and 12 includes a disc 60 of insulating material attached to the rim 43 of the spring 16 shown in Fig. 3 and a yoke 61 mounted for a limited sliding movement between stops 62a and 62b. A lever 63 having a pin and slot connection 64 with the yoke and a tension spring 65 place the yoke in unstable equilibrium at its central position so that whenever it is moved across its central position the spring urges it against one or the other of the stops 62a, 62b. The disc 60 carries a pin 66a which engages the lever 63 and throws the yoke against the stop 62a when the disc 60, rim 43 and pinion 18 have moved to their extreme position in a clockwise direction. This is when the controlling elements 15 are at their inner position as shown in Fig. 3. The disc 60 carries a pin 66b which engages the lever 63 and throws the yoke against the stop 62b when the disc has turned to its extreme position in an anti-clockwise direction, that is, when the controlling elements 15 are in their outer position. Consequently, during anti-clockwise rotation of the disc 60, a pair of terminals 67 on the arm 68a of the yoke engage a conductor 69 on the disc 60 and remain connected by this conductor during the anti-clockwise turning of the disc 60. The connection of the terminals 67 by the conductor 69 lights a lamp 67a through the electric circuit illustrated. Since anti-clockwise turning of the disc 60 occurs while the controlling elements 15 are moving outwardly and the cam followers 21 are in the part c of the cams 20, the lighting of the lamp 67a indicates that the relation of change in blade pitch to change in rotational speed is appropriate for take-off and landing. When the controlling elements 15 reach their outer positions and the yoke 61 is thrown against the stop 62b in the manner already explained, a pair of terminals 70 on the arm 68b of the yoke are connected by a conductor 71 to light a lamp 70a and maintain it lighted during the first part of the clockwise movement of the disc 60 which occurs while the cam followers 21 are in the slopes a of the cams 20. The lighting of the lamp 70a, therefore, indicates that the airscrew is in condition for climbing. When the cam followers 21 pass from the slope a to the slope b of the cams 20, the conductor 71 moves out of contact with the terminals 70 and into contact with terminals 72 to light a lamp 72a indicating that the airscrew is in condition for cruising. As the lamps are, of course, located on the instrument board of the airplane, the electric circuits include two collector rings 73 on the shaft 11 of the airscrew. The lamps 67a, 70a and 72a are preferably placed behind transparent signs 67b, 70b and 72b which indicate to the pilot both the condition of the airscrew and the throttle maneuver required to place it in another condition, thus making use of my new airscrew easy for pilots inexperienced in the use of variable pitch airscrews.

It may be noted that, instead of making the parts a, b and c of each cam as a continuous circuit for a single follower, it would be possible, although much less desirable, to omit the part c or place it at a distance from the slopes a, b, and use a mechanism similar to the shifting yoke 61 to throw a cam follower into and out of operative contact with the slopes a, b when the controlling elements are in their outer and inner positions.

What I claim is:

1. In a variable pitch airscrew having a relatively fixed hub element, a turnably mounted blade spindle and a controlling element responsive to speed of rotation, a cam connection connecting the controlling element, the blade spindle and the fixed element, and comprising a cam follower and an endless groove having a plurality of different parts each of which is operative to control the pitch in a predetermined part of a complete rotary speed cycle, the different parts of the groove being differently inclined so as to make variation in pitch bear different relations to variation in speed of rotation.

2. In a variable pitch airscrew having a relatively fixed hub element, a turnably mounted blade spindle and a controlling element responsive to speed of rotation, a cam connection connecting the controlling element, the blade spindle and the fixed element, and comprising a cam follower and an endless groove having a plurality of different parts each of which is operative to control the pitch in a predetermined part of a complete rotary speed cycle, the different parts of the groove being differently inclined so as to make variation in pitch bear different relations to variation in speed of rotation, and an electric indicator indicating which part of the cam connection is operative.

3. In a variable pitch airscrew, the combination with a relatively fixed hub element and a turnably mounted blade spindle, of a controlling element movable between inner and outer positions and urged towards its outer position by centrifugal force, resilient means urging the controlling element towards its inner position, and an interconnection between the controlling element, the blade spindle and the hub element arranged to cause first an increase and then a decrease in the pitch of the blade on movement of the controlling element from its outer to its inner position and to permit movement of the controlling element from its inner to its outer position without increase in the pitch of the blade.

4. In a variable pitch airscrew, the combination with a relatively fixed hub element and a turnably mounted blade spindle, of a controlling element movable between inner and outer positions and urged towards its outer position by centrifugal force, resilient means urging the controlling element towards its inner position, and an interconnection between the controlling element, the blade spindle and the hub element arranged to cause first an increase and then a decrease in the pitch of the blade on movement of the controlling element from its outer to its inner position and to cause a slight decrease followed by a slight increase in the pitch of the blade on movement of the controlling element from its inner to its outer position.

5. In a variable pitch airscrew, the combination with a relatively fixed hub element and a turnably mounted blade spindle, of a rotational-speed-responsive controlling element movable between inner and outer positions, and an interconnection between the controlling element, the blade spindle and the hub element including a cam follower and a cam formed to guide the cam follower entirely around the periphery of an area during one complete reciprocation of the controlling element.

6. In a variable pitch airscrew for airplanes, the combination with a fixed hub element, a turnably mounted blade spindle and a rotational-speed-responsive controlling element, of an interconnection between the controlling element, the blade spindle and the hub element, including a cam providing two paths between two end points and a cam follower engaging said cam, the cam and follower being so formed that in reciprocation of the follower between said end points, the follower takes one path when moving in one direction and the other path when moving in the opposite direction.

7. In a variable pitch airscrew for airplanes, the combination with a relatively fixed hub element, a turnably mounted blade and a speed-responsive controlling element, of an interconnection between the blade, the controlling element and the hub element including a cam follower and a cam providing two grooves with each groove connecting two end points and formed to direct the cam follower into one of said grooves from one end point and into the other of said grooves from the other end point, and an eccentric weight on the blade counterbalancing its centrifugal twisting moment to prevent said moment from interfering with the guiding of the cam follower by the cam.

8. In a variable pitch airscrew for airplanes, a radially movable controlling element urged outwardly by centrifugal force, a rack secured to said element, a pinion engaging said rack, a metal rim on which said pinion is mounted, a metal ring within said rim, means for holding said ring against turning, and an annular body of rubber having its inner surface vulcanized to said ring and its outer surface vulcanized to said rim, and serving as a tension spring to resist outward movement of the controlling element.

9. In a variable pitch airscrew for airplanes, a pair of diametrically opposite radially movable controlling elements, each of which is urged outwardly by centrifugal force, two racks extending inwardly from each controlling element, two pinions each engaging one rack of each controlling element, torsion springs urging said pinions to turn in such direction as to resist outward movement of the controlling elements, diametrically opposite turnable blade spindles, and a cam connection between each controlling element and one of the blade spindles.

10. In an airscrew having a hub connected to an engine-driven shaft and a blade mounted in the hub for turning between high pitch and low pitch, mechanism responsive to the speed of rotation of said shaft for controlling the pitch of said blade in accordance with changes in the engine speed, said mechanism comprising a controlling element movable under the action of centrifugal force between predetermined inner and outer positions, resilient means urging the controlling member towards its inner position, and interacting members one of which is connected to said controlling element and the other of which is connected to said blade, one of said members having a portion adapted to cooperate with the other member to leave the blade in low pitch as the controlling element moves from said inner position to said outer position when the engine speed is increased from idling speed to maximum speed, another portion adapted to cooperate with the other member to turn the blade to high pitch position as the controlling element moves from its outer position to an intermediate position when the engine speed is reduced from maximum speed to cruising speed, and a third portion adapted to cooperate with said other member to turn the blade from high pitch position to low pitch position as the controlling element moves from its intermediate position to said inner position when the speed of the engine is reduced from cruising speed to idling speed, whereby the pitch of the propeller blade is controlled by the normal operation of the throttle of the engine so that the pitch is small during take-off and landing and is increased during horizontal flight.

11. In an airscrew having a hub connected to an engine-driven shaft and a blade mounted in the hub for turning between high pitch and low pitch, mechanism responsive to the speed of rotation of said shaft for controlling the pitch of the blade in accordance with change in the engine speed, said mechanism comprising a resilient means and a controlling element movable under the action of centrifugal force against the action of said resilient means between predetermined inner and outer positions, and interacting members connected to the controlling element and the blade respectively and constrained so that their relative movement is along one path when the controlling element is moved from its inner to its outer position by opening the throttle of the engine and is along a different path when the controlling element is moved from its outer to its inner position by closing the engine throttle.

12. A self-contained controllable pitch propeller, comprising a hub, a blade spindle turnably mounted in the hub, a resiliently restrained centrifugal controlling element in the hub movable between inner and outer positions, and a mechanical connection between the controlling element and the blade spindle including means to increase and then decrease the pitch of the blade during movement of the controlling element from its outer to its inner position and means permitting movement of the controlling element from its inner to its outer position without increasing the pitch of the blade.

13. In an airscrew having a hub connected to an engine-driven shaft and a blade mounted in the hub for turning between high pitch and low pitch, a resiliently restrained centrifugal controlling element responsive to speed of rotation, a mechanical connection between the controlling element and the blade arranged to vary the blade pitch inversely to speed of rotation in the upper part of the rotational speed range and directly with speed of rotation in the lower part of the rotational speed range, means acting when maximum speed of rotation is obtained by wide opening of the throttle to bring said connection into operation, and means acting when minimum speed of rotation is obtained by placing the throttle in idling position to put said connection out of operation until maximum speed of rotation is reached.

14. In an airscrew having a relatively fixed hub element, turnably mounted blade spindles and a resiliently restrained controlling element responsive to speed of rotation, an interconnection between the blade spindles, the controlling element and the hub element arranged to translate movements of the controlling element into turning movements of the blade spindles, including a cam follower and a cam having two slopes inclined in different directions, and means for holding the cam follower out of contact with said slopes when the speed of rotation of the airscrew is increasing from minimum to maximum.

15. A self-contained controllable pitch airscrew, comprising a hub mountable on an engine shaft, a blade turnably mounted in the hub, speed-responsive means carried by the hub and movable between a high-speed position corresponding to maximum engine speed and a low-speed position corresponding to idling engine speed, and a mechanical connection between the speed-responsive means and the blade including means to increase and then decrease the pitch of the blade during movement of the speed-responsive means from its high-speed position to its low-speed position and means permitting movement of the speed-responsive means from its low-speed position to its high-speed position without increasing the pitch of the blade.

DAVID H. BOTTRILL.